United States Patent [19]

Beal

[11] 3,713,950
[45] Jan. 30, 1973

[54] TIRE BUILDING MACHINE WITH TELESCOPIC INTERCONNECTION FOR MOUNTING A BEAD RING HOLDER

[75] Inventor: Lawrence E. Beal, Wadsworth, Ohio

[73] Assignee: Eagle-Picher Industries, Inc., Cincinnati, Ohio

[22] Filed: April 30, 1970

[21] Appl. No.: 33,370

[52] U.S. Cl..................................156/401, 156/403
[51] Int. Cl. ............................................B29h 17/22
[58] Field of Search......156/131, 132, 394, 398, 400, 156/401, 402, 403

[56] References Cited

UNITED STATES PATENTS 1,562,754   11/1925   Gautier..............................156/403
2,951,526   9/1960    Haase.................................156/401

Primary Examiner—Stephen C. Bentley
Attorney—Teare, Teare & Sammon

[57] ABSTRACT

A tire building machine including a frame and a collapsible tire building drum mounted for rotation thereon. Bead setter units are mounted on the frame adjacent the opposite ends of the drum for registering bead rings therewith. Each of the bead setter units includes a bead ring holder movable toward and away from an adjacent end of the drum. Each end of the drum includes an axially extending protuberance which is adapted for telescopic connection with a respective coaxially aligned sleeve carried by each of the holders to align the bead rings with respect to the drum. The drum includes inflatable turn-up bladders adjacent the opposed ends thereof and each protuberance comprises a shell having a cavity therein adapted to receive and conduct air under pressure to the turn-up bladders.

13 Claims, 8 Drawing Figures

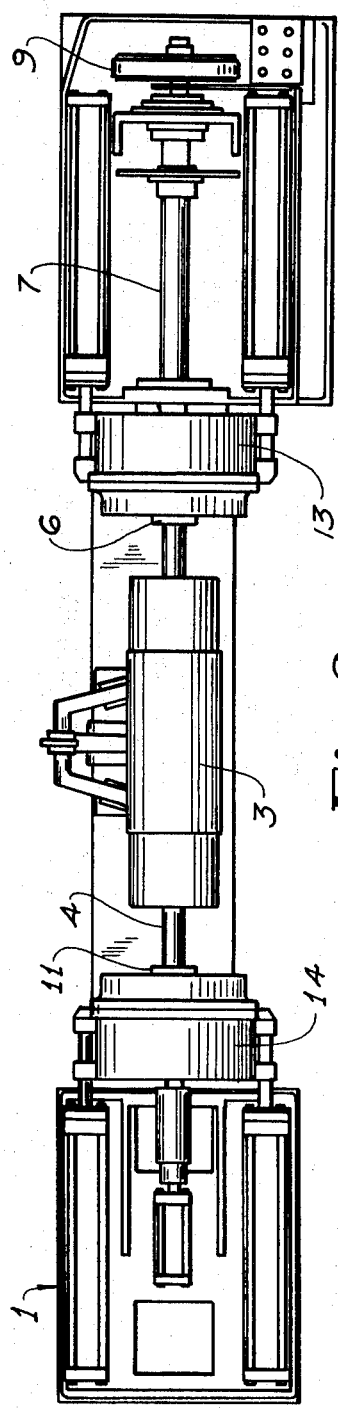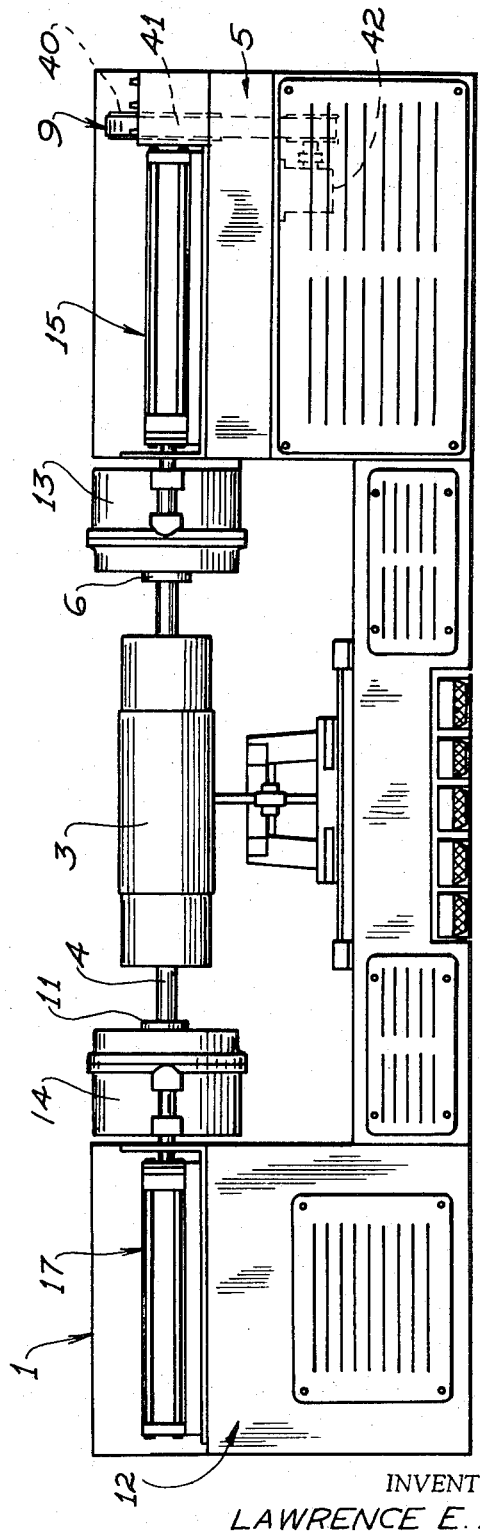

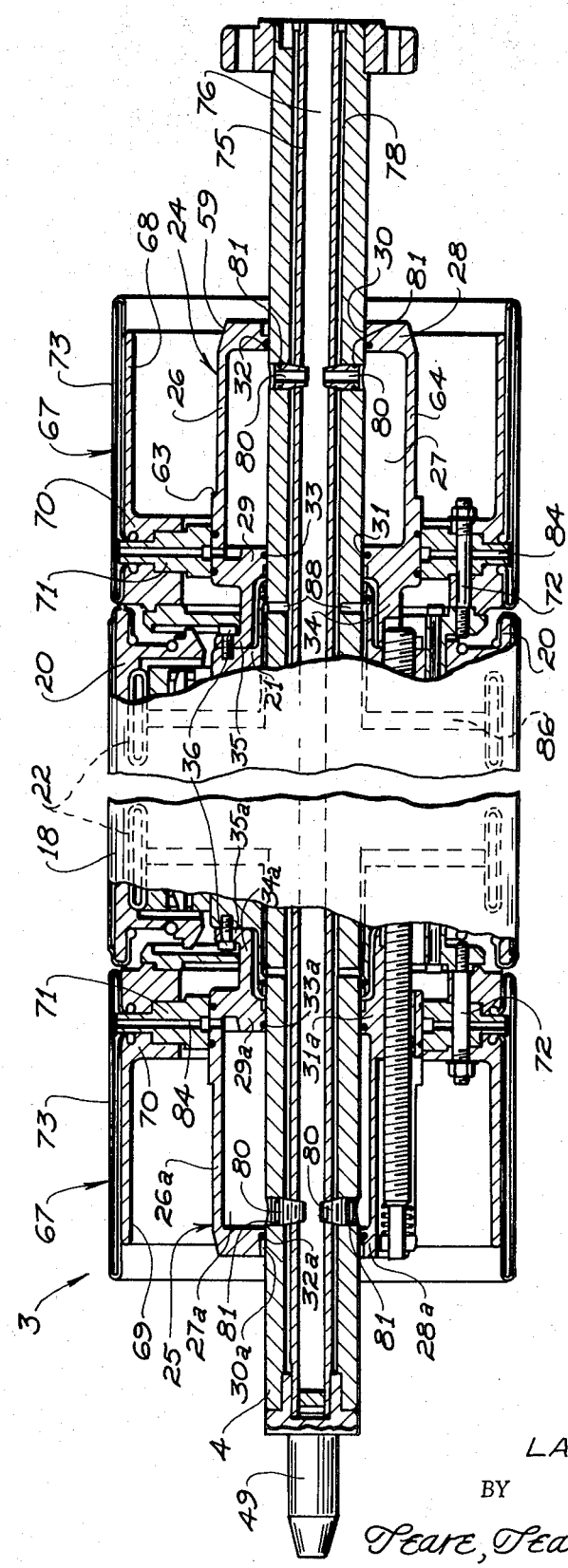

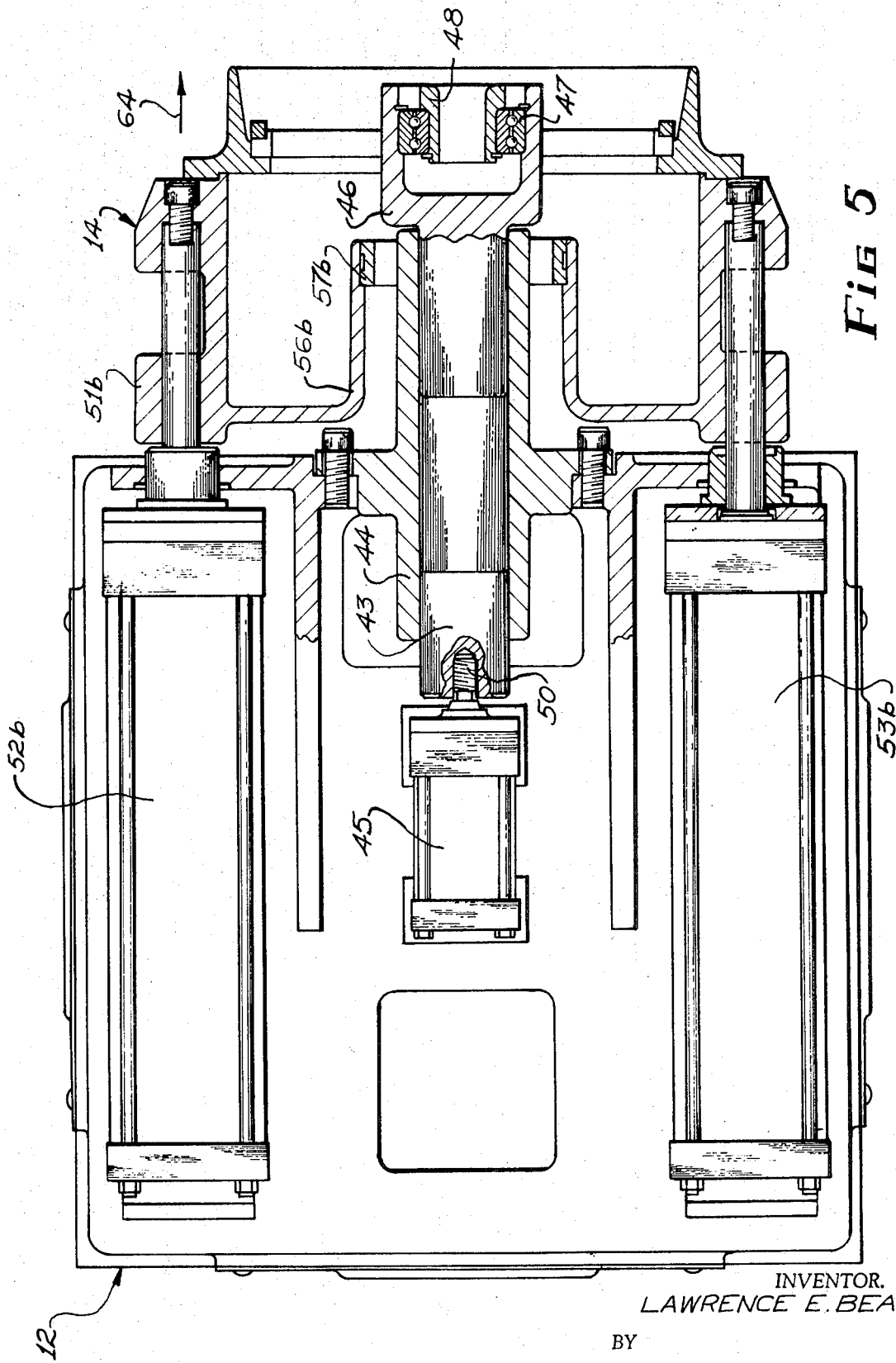

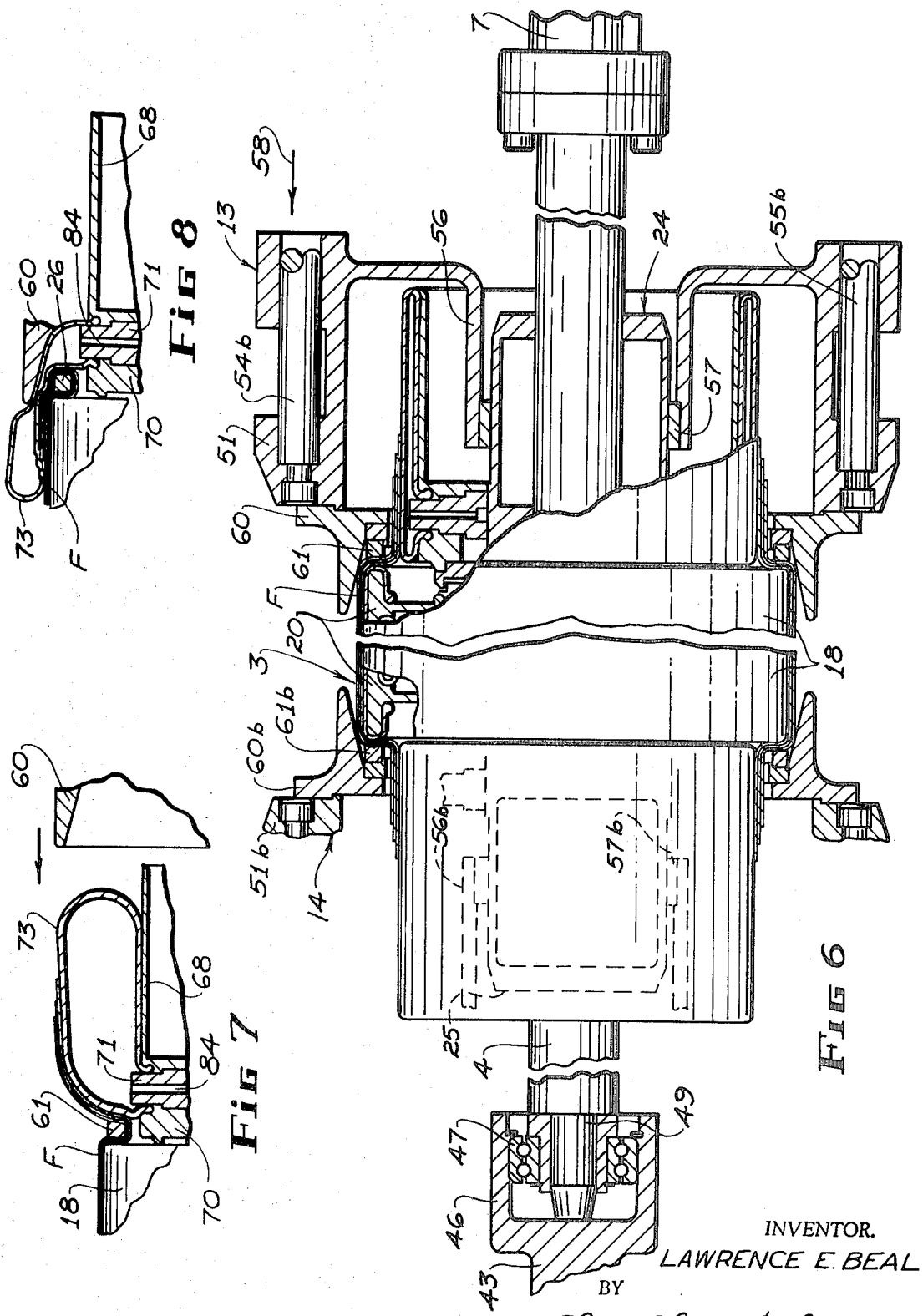

TIRE BUILDING MACHINE WITH TELESCOPIC INTERCONNECTION FOR MOUNTING A BEAD RING HOLDER

BACKGROUND OF THE INVENTION

The present invention relates to an apparatus for building tires, and more particularly to an improved bead setter assembly for more accurately aligning bead rings with a tire building drum. Conventionally, tire building machines include a rotatable drum having an expandable central portion on which the fabric plies are applied for building up a tire. The drums have included outer sections adjacent the opposite ends of the central portion on which inflatable bladders have been mounted. Bead setter units have been provided which have been movably mounted on the machine being adapted to move toward and away from the opposite ends of the tire building drum to register circular bead rings on the drum adjacent to the opposite ends of the central portion. These bead setter units have generally included cylindrical bead ring holders which are mounted generally concentrically with respect to the drum being adapted to carry a bead ring axially over the respective outer sections of the drum. These bead ring holders have generally been supported entirely, or for the most part, by the machine frame and independent of the drum. After the bead rings have been mounted in the bead ring holders, the fabric plies, which are generally sticky and/or tacky, are applied on the drum so that the outer ends extend axially beyond the central portions so as to overlie the turn-up bladders. After the fabric plies have been placed around the drum, the drum is expanded and the bead rings are moved inwardly into registration against the shoulder formed by the expansion of the central portion with respect to the outer sections. This operation stitches the lateral face of the bead ring against the radially extending outer face of the shoulder. The bead ring holders are then withdrawn from the ends of the drum and the turn-up bladders are inflated, and the bead ring holders are again moved axially toward the drum into engagement with the inflated turn-up bladders to turn up the ends of the fabric and form the bead portion of the tire. As tires are now required to operate at greatly increased rotational speeds, it has been necessary to improve the overall balance of tires, and more particularly, to reduce the radial run out thereof, or at least maintain such within the lowest possible tolerances.

SUMMARY OF THE INVENTION

The present invention contemplates providing an improved bead setting apparatus for use in a tire building machine having a frame and a collapsible tire building drum journaled in the frame. The apparatus comprises bead setter units movably mounted on the frame adjacent the opposite ends of the drum being adapted for movement toward the drum to place bead rings thereon, each of the bead setter units includes a holder having a telescopic connection with the drum for registering an associated bead ring with the drum. The connection comprises a protuberance on the drum and a coaxially aligned sleeve carried by the holder adapted to telescopingly receive the protuberance therein. The protuberance coacts with the sleeve to support the holder in predetermined relation to the drum when moved into position with respect thereto. The other bead setter unit includes a holder having another telescopic connection with the drum for registering another bead ring with the opposite end of the drum. The drum includes an outer portion defining the peripheral confines of the drum, and the protuberance on the drum is positioned within the confines of and in spaced relation from the other portion thereof. In addition, the drum includes a shaft journaled for rotation in the frame. The protuberance is generally cylindrical, in transverse cross section, and extends axially outwardly from the drum in concentric relation to the shaft being adapted to be received in telescoping relation within the sleeve. Further, the drum includes an inflatable turn-up bladder mounted radially outwardly from and adjacent to the protuberance, and the protuberance comprises a shell having a cavity connected to a source of pressurized air for conducting the air to the turn-up bladder. Still further, the shaft includes a plurality of longitudinally extending passageways connected in fluid communication to the source of pressurized air, and one of the passageways is adapted for delivering pressurized air to the turn-up bladder. In addition, the drum includes a plurality of sections each of which is radially movable with respect to the drum. Inflatable drum bladders are carried by the drum adapted to move the sections upon inflation thereof and another of the passageways is connected in fluid communication with the drum bladders for inflation thereof.

By the foregoing arrangement, the bead ring holders are directly connected with the drum, and thus, misalignment of the bead rings on the drum caused by minor deflections of the supporting structure is greatly minimized and radial run-out can be more readily controlled. In addition, this construction obviates the need for hose connections between a source of pressurized air and the turn-up bladder provides a more rugged and maintenance free construction than heretofore known.

BRIEF DESCRIPTION OF THE DRAWINGS

FIG. 1 is a side elevation view of a tire building machine incorporating the present invention;

FIG. 2 is a top plan view of the tire building machine shown in FIG. 1;

FIG. 3 is a longitudinal vertical section view of the tire building drum incorporating the present invention with parts broken away and parts shown in section;

FIG. 5 is an enlarged, top plan view of the outboard end of the tire building machine shown in FIG. 2 with parts broken away and parts shown in section;

FIG. 6 is a partial longitudinal sectional view of one end of the tire drum, turn-up bladder and bead setting mechanism showing the relative relationship thereof with the bead ring holder in its innermost bead setting position;

FIG. 7 is a view similar to FIG. 6 with the turn-up bladder fully inflated; and

FIG. 8 is FIG. 7 with the cage of the bead ring holder in its innermost ply turning position.

DESCRIPTION OF THE PREFERRED EMBODIMENTS

Figure 4:
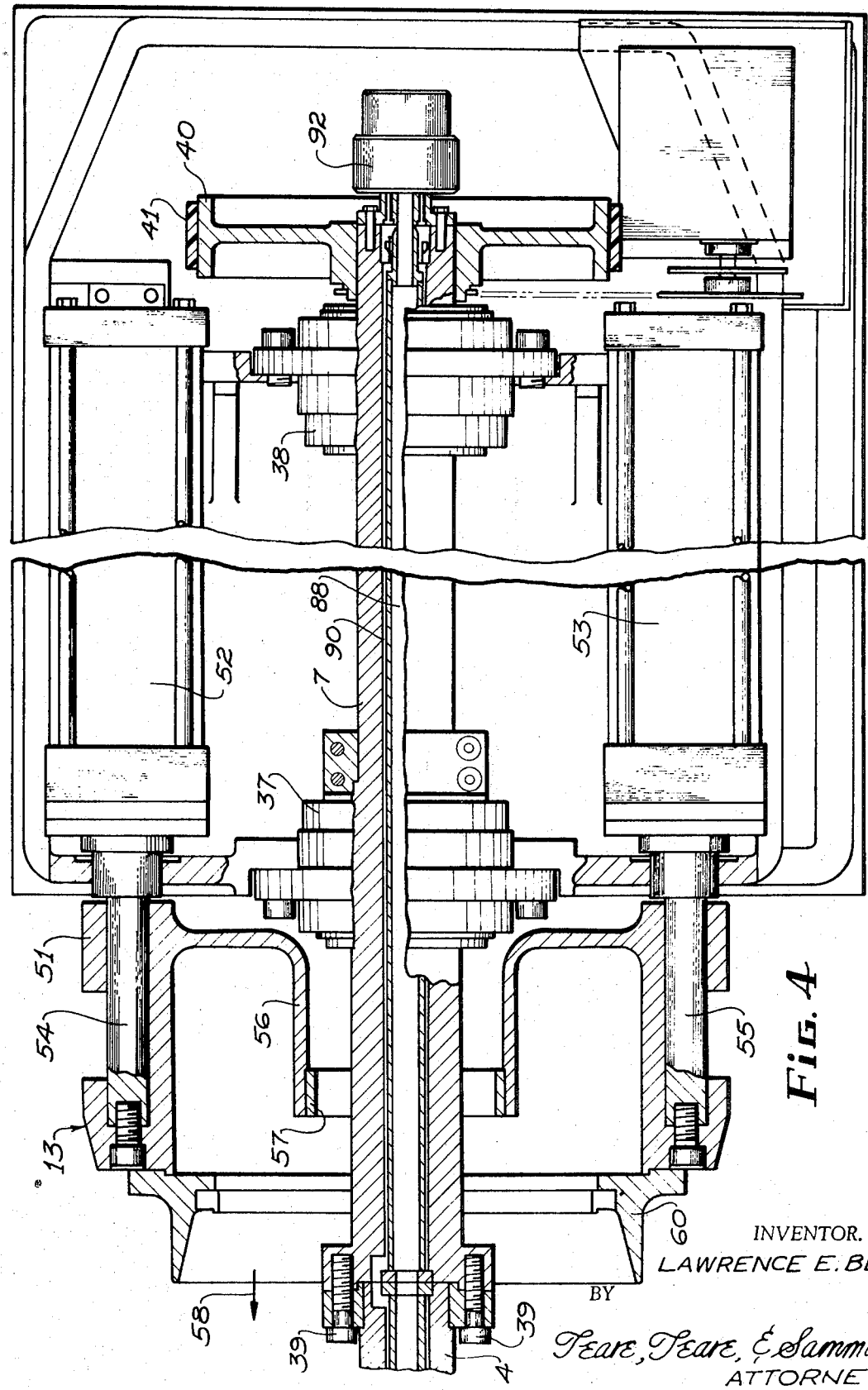
FIG. 4 is an enlarged, fragmentary, top plan view of the inboard end of the tire building machine shown in FIG. 2 with parts broken away and parts shown in section.

Referring now again to FIGS. 1 and 2, there is illustrated generally at 1 a tire building machine having a frame on which a drum 3 is mounted for rotation with a rotatable shaft 4. The shaft 4 is fixably coupled at one end or inboard end, such as at 6, to a drive shaft 7. The drive shaft is operably connected to a suitable drive mechanism, indicated generally at 9, which is carried by the frame adjacent the inboard end of the machine. The opposite end of the shaft is detachably connected, such as at 11, to the outboard end of the frame, designated generally at 12. By this arrangement, the drum is rigidly supported adjacent both ends during the ply build-up operation and may be detached from the machine to enable removal of the tire carcass from the tire building drum in a manner which is more fully and completely described in a co-pending application, Ser. No. 35,540 filed May 7, 1970.

Bead setter units 13 and 14 are mounted adjacent the opposite ends of the drum being operably connected to a fluid operated mechanism, such as at 15 and 17, for moving the units 13 and 14 toward and away from the drum for placement of bead rings therewith in a manner to be more fully described hereinafter.

Referring now to FIG. 3, the drum 3 comprises an expandable central section 18 consisting of the plurality of sections 20 mounted for radial movement on a hub 21 which is secured to the shaft 4. Annular inflatable bags 22 are mounted on the hub 21 and are connected in fluid communication to a source of pressurized air to move the sections 20 radially outwardly in a manner well known in the art, one form of which is described in detail in U.S. Pat. No. 3,078,204 dated Feb. 19, 1963.

Now in accordance with the present invention, protuberances 24 and 25 project axially outwardly from the opposite ends of the hub 21 of the central portion 18. As the protuberances 24 and 25 are of generally identical construction, only one, such as 24, will be described in detail with like parts on the protuberance 26 being designated by like numerals followed by the suffix *a*.

Preferably, the protuberance 24 is of a hollow construction comprising a cylindrical body or shell 26 which projects axially outwardly from the central portion 18 and in spaced, generally concentric relation to the shaft 4 defining a cavity 27 which surrounds the shaft. The shell 26 includes inner and outer radially depending walls 28 and 29 having axially aligned, central openings 30 and 31, respectively, which are adapted to receive the shaft 4 in seated engagement therein. O-rings 32 and 33 are provided to maintain an air-tight seal between the walls 28 and 29 and the shaft 4. The shell 26 is provided with an inner sleeve 34 which extends axially inwardly from the inner wall 28 toward the central portion 18. The sleeve 34 may be provided with an annular flange 35 adjacent its innermost end being adapted for rigid connection to the hub 21, such as by bolts 36 or the like.

Referring now to FIG. 4, the shaft 7 is journaled for rotation in bearings 37 and 38 which are supported adjacent the inboard end of the frame. The shaft 7 is rigidly coupled at its inner end to the shaft 4, such as by bolts 39, and has a drive sheave 40 mounted adjacent its opposite end. A flexible belt 41 is trained about the sheave 40 being operably connected to a suitable drive mechanism, such as an electric motor 42 (FIG. 1) for imparting rotation to the shaft 7, and thus, the drum 3.

Referring now to FIG. 5, a plunger member 43 is slidably mounted within a sleeve 44 which is mounted adjacent the outboard end 12 of the frame being adapted for reciprocating movement axially toward and away from the drum 3. One end of the plunger member 43 may be connected to a suitable fluid operated motor, such as at 45 to impart reciprocating movement thereto. The opposite end of the plunger member 43 is provided with a cylindrical sleeve 46 having a support bearing 47 mounted therein. A collar 48 is journaled for rotation within the support bearing 47 being disposed in axial alignment with the shaft 7 and adapted to receive the outboard end of the shaft 4 therein. Referring again to FIG. 3, the outboard end of the shaft 4 is provided with a stub shaft 49 of reduced diameter which is adapted to be slidably disposed within the collar 48 for supporting the drum for rotation on the frame. In addition, the fluid motor 45 includes a piston rod 50 having a throw sufficient to move the collar 48 inwardly toward the drum 3 to dispose the stub shaft 49 within the collar 48, and thus, rigidly support the outboard end of the drum during the tire forming operation as shown in FIG. 6.

As the bead setter units 13 and 14 are generally identical, only one such as 13 will be described in detail herein with like parts of the bead setter unit 14 being designated by like numerals having the suffix "b" added thereto. Now referring again to FIG. 4, the bead setter unit 13 comprises a bell-type housing 51 which extends inwardly from the inboard end of the frame being operably connected to the fluid operated means 15, such as fluid motors 52 and 53 which are mounted on the frame and may be connected to a suitable source of pressurized air (not shown). As shown, the motors 52 and 53 are provided with piston rods 54 and 55, which are adapted for reciprocating movement parallel to the longitudinal axis of the shaft 4. The rods 54 and 55 are rigidly connected to and support the housing 51 being adapted to impart movement thereto toward and away from the drum 3 upon selective actuation of the motors 52 and 53.

A sleeve 56 is carried internally by the housing which extends axially along the shaft being adapted to telescopingly receive the protuberance 24 and rigidly connect the bead setter unit 14 to the drum 3. Preferably, the sleeve 56 is disposed generally concentrically with respect to the shaft 7 and includes a generally cylindrical collar 57 mounted adjacent the inner marginal end thereof adapted for seating engagement with the protuberance 24. As shown, the inner diameter of the collar 56 is greater than the maximum transverse dimension of the coupling between the shafts 4 and 7 to provide sufficient clearance to enable the collar 57 to move axially inwardly over the coupling and into engagement with the protuberance 24. Further, the inner diameter of the collar 56 is of a sufficient size so that the protuberance 24 will fit snugly therein. In addition, the protuberance 24 is beveled at the outer end or the end facing the sleeve 56, such as at 59, to cammingly guide the sleeve 56, such as at 59 to cammingly guide the sleeve 56 into alignment within the protuberance 24. By this arrangement, the bead setter unit 13 will be rigidly supported and precisely aligned with the tire building drum when moved into the bead setting position as shown in FIG. 6.

Referring again to FIG. 4, a bead ring holder or cage 60 of conventional construction is suitably connected, such as by screws or the like (not shown), to the inner marginal edge of the housing 51 being adapted to support a bead ring 61 for registration with the drum 3. As shown in FIG. 6, when the drum is in the expanded position, the motors 52 and 53 are selectively actuated to move the housing 51 toward the drum 3 as indicated by the arrow 58. Preferably, the shell 26 is provided with an annular shoulder 63 spaced inwardly from the outer end which projects radially outwardly from the outer surface 64 of the shell being adapted to abuttingly engage the collar 56 to provide a stop for limiting axial movement of the housing 51 toward the drum 3. Preferably, the shoulder 63 is positioned a sufficient distance inwardly from the outer end so that upon placement of a bead ring on the drum 3 the bead ring will contact the fabric plies F which extend beyond the central portion 18, as shown in FIG. 6.

Similarly, and as shown in FIG. 5, the housing 51b of the bead setter unit 14 is adapted to move inwardly upon actuation of the fluid motors 52b and 53b as indicated by the arrow 64. The sleeve 56b and collar 57b are arranged concentrically and in axially aligned relation to the sleeve 46. Further, the collar 57b has an inner diameter greater than the maximum transverse dimension of the sleeve 46 so that the sleeve 56b will move inwardly over the sleeve 46 into telescoping seated engagement with the protuberance 25 as indicated by the phantom lines in FIG. 6.

Referring again to FIG. 3, a ply turn-up device 67 is mounted adjacent each end of the drum 3, The turn-up device 67 comprises rigid, cylindrical supports 68 and 69 which extend axially outwardly from the central portion 18 in overlying relation with respect to the protuberances 24 and 25, respectively, being spaced radially outwardly therefrom. Each of the supports 68 and 69 includes a depending flange 70 which is supported on a circular hub 71. As shown, the hubs 71 are mounted on the respective protuberances 24 and 25 with the entire assembly being suitably secured to the web 21, such as by bolts 72 or the like. Annular turn-up bladders 73 are mounted outwardly of the supports and extend circumferentially thereabout being adapted to be inflated from a source of pressurized air (not shown).

To inflate the respective bladders 73, the shaft 4 is preferably of a hollow construction having a longitudinally extending tubular member 75 mounted therein to divide the shaft 4 into the inner and outer sealed passageways 76 and 78, respectively. Radially extending fittings, such as at 80, are mounted on the shaft 4 and extend through the outer passageway 78 and into the inner passageway 76. The fittings 80 are sealed off from the outer passageway 78, such as by O-rings 81, to prevent air from the outer passageway 78 from entering the cavities 30 and 30a. In addition, each of the hubs 71 is provided with radially extending passageways 84 which connect the interior of the turn-up bladders 73 in fluid communication with the cavities 30 and 30a whereby upon introduction of air into the inner passageway 76 the turn up bladders 73 will be inflated (FIG. 7) and the cage 60 may be moved inwardly as indicated by the arrow 85 to turn up the ends of the fabric plies F to form the tire bead as shown in FIG. 8.

To inflate the drum bladders and expand the drum 3 (FIG. 6), the shaft is provided with radially extending openings, such as at 88 which are connected at one end in fluid communication with the outer passageway 78 and at the opposite end to passageways (diagrammatically illustrated at 86 in FIG. 3) which are connected in fluid communication to the drum bladders 22. Thus, introduction of air into the outer passageway will cause the drum bladders to be inflated.

To selectively control the flow of pressurized air to the shaft 4, the shaft 7 is simiarly divided into inner 88 and outer 90 passageways which are sealed from one another. A suitable pneumatic switching valve 92 as well known in the art may be connected to the shaft 7 at the end remote from the coupled end being adapted to selectively introduce air from a source of pressurized air (not shown) into the inner and/or outer passageways, as desired.

I claim:

1. In a tire building machine having,
   a frame,
   a tire building drum journalled in said frame,
   bead ring placement holders moveably mounted on said frame adjacent the opposite ends of said drum for movement toward said drum to place said bead rings thereon,
   one of said holders having a telescopic connection with said drum for registering said bead ring with said drum,
   said connection comprising a sleeve carried by said holder and a co-axially aligned protuberance on said drum,
   said protuberance coacts with said sleeve to support said holder in predetermined relation to said drum when moved into position with respect thereto,
   said drum includes a shaft journalled for rotation in said frame,
   said protuberance is generally cylindrical in transverse cross-section and extends axially outwardly from said drum in concentric relation to said shaft being received in telescopic relation within said sleeve,
   said drum includes an inflatable turn-up bladder mounted radially outwardly from an adjacent to said protuberance, and
   said protuberance comprises a shell having a cavity connected to a source of pressurized air for conducting said air to said turn-up bladder.

2. In a tire building machine in accordance with claim 1, wherein
   the other of said bead ring holders has another telescopic connection with said drum for registering another bead ring with the opposite end of said drum, and
   said other connection comprising a protuberance on the opposite end of said drum and a coacting coaxially aligned sleeve on said other bead ring holder.

3. In a tire building machine in accordance with claim 1, wherein
   said drum includes an outer portion defining the peripheral confines of said drum, and said protuberance on said drum is positioned within said confines in spaced relation from said outer portion thereof.

4. In a tire building machine in accordance with claim 1, wherein
fluid operated means is carried by said frame for moving said bead ring holder axially toward and away from said drum.

5. In a tire building machine in accordance with claim 1, wherein
said drum includes a shaft journalled for rotation in said frame,
said shaft includes a plurality of longitudinally extending passageways connected in fluid communication to a source of pressurized air, and
one of said passageways for delivering pressurized air to said turn-up bladder.

6. In a tire building machine in accordance with claim 1, wherein
said drum includes a cylindrical support member adjacent one end thereof,
said inflatable turn-up bladder mounted on said support member adjacent said protuberance,
said protuberance being positioned radially inwardly with respect to said support member and spaced therefrom, and
said sleeve mounted on said protuberance in said space when said holder is moved into position adjacent said drum.

7. In a tire building machine in accordance with claim 5, wherein
said drum includes a plurality of sections, each of said sections being radially moveable with respect to said drum,
inflatable drum bladders carried by said drum to move said sections upon inflation thereof, and
another of said passageways is connected in fluid communication with said drum bladders.

8. In a tire building machine in accordance with claim 7, wherein
said one of said passageways extends longitudinally through and is sealed from the other of said passageways.

9. In a tire building machine in accordance with claim 8, wherein
said one passageway is connected in fluid communication with said cavity, and
said cavity is connected in fluid communication with said turn-up bladder.

10. A tire building machine in accordance with claim 2, wherein
said drum includes another inflatable turn-up bladder mounted radially outwardly from and adjacent to said protuberance of said other connection, and
said protuberance of said other connection comprises another shell having another cavity connected to said source of pressurized air for conducting said air to said other turn-up bladder.

11. In a tire building machine in accordance with claim 10, wherein
said drum includes a shaft journalled for rotation in said frame,
said shaft includes a plurality of longitudinally intending passageways connected in fluid communication to a source of pressurized air, and
one of said passageways is connected in fluid communication to said turn-up bladders for delivering pressurized air thereto.

12. In a tire building machine in accordance with claim 11, wherein
each of said cavities are connected in fluid communication to said one passageway and a respective one of said turn-up bladders for delivering pressurized air thereto.

13. In a tire building machine in accordance with claim 12, wherein
said protuberances comprise hollow shells disposed in spaced, generally concentric relation with respect to said shaft each defining a cavity which surrounds said shaft.

* * * * *